United States Patent
Springer, Jr.

[11] Patent Number: 5,831,244
[45] Date of Patent: Nov. 3, 1998

[54] VEHICULAR ELECTRIC HEATER

[76] Inventor: Edward Leo Springer, Jr., P.O. Box 12, Valley Lee, Md. 20692-0012

[21] Appl. No.: 961,505

[22] Filed: Oct. 30, 1997

[51] Int. Cl.[6] ...................................................... B60L 1/02
[52] U.S. Cl. ........................... 219/203; 219/202; 219/205; 219/494; 219/497
[58] Field of Search ................................... 219/203, 202, 219/205, 494, 497; 237/12.3; 165/12; 392/385

[56] References Cited

U.S. PATENT DOCUMENTS

| | | | |
|---|---|---|---|
| 1,528,300 | 3/1925 | Noonan | 392/383 |
| 1,573,944 | 2/1926 | Jancke | 392/383 |
| 3,264,450 | 8/1966 | Wallace | 392/307 |
| 3,440,398 | 4/1969 | Nilssen | 392/307 |
| 3,911,934 | 10/1975 | Helbling | 132/271 |
| 4,003,388 | 1/1977 | Nopanen | 219/222 |
| 4,013,083 | 3/1977 | Helbling | 132/271 |
| 4,188,527 | 2/1980 | Follmer | 219/202 |
| 4,293,759 | 10/1981 | Higgins | 219/202 |
| 4,327,278 | 4/1982 | Tomaaro | 392/379 |
| 4,350,287 | 9/1982 | Richards | 237/12.3 A |
| 4,366,368 | 12/1982 | Stephens, III | 392/385 |
| 4,847,468 | 7/1989 | Hufstetler | 219/203 |
| 4,965,432 | 10/1990 | Harris | 219/203 |
| 5,012,070 | 4/1991 | Reed | 219/202 |
| 5,025,130 | 6/1991 | Slone | 219/203 |
| 5,115,116 | 5/1992 | Reed | 219/202 |
| 5,187,349 | 2/1993 | Curhan et al. | 219/202 |
| 5,220,805 | 6/1993 | Fukudomi | 62/126 |
| 5,222,661 | 6/1993 | Wenhart | 236/49.3 |
| 5,279,459 | 1/1994 | Single, II | 237/2 A |
| 5,399,838 | 3/1995 | Brown | 219/202 |
| 5,434,946 | 7/1995 | Brazilai et al. | 392/385 |

*Primary Examiner*—Teresa J. Walberg
*Assistant Examiner*—Vinod D. Patel

[57] ABSTRACT

A vehicle heater is provided including a heater coil assembly situated in a ventilation system of a vehicle and adapted to generate heat only during the receipt of a voltage. A temperature control dial is mounted on a control panel of the vehicle for selecting a temperature. Finally, a control mechanism is adapted to transmit a predetermined voltage amount to the heater coil, wherein the predetermined voltage is proportional to the temperature selected by way of the temperature control dial.

1 Claim, 2 Drawing Sheets

VEHICULAR ELECTRIC HEATER

BACKGROUND OF THE INVENTION

1. Field of the Invention

The present invention relates to vehicular water heater cores and more particularly pertains to a new vehicular electric heater for quickly and efficiently heating a passenger compartment of a vehicle.

2. Description of the Prior Art

The use of vehicular water heater cores is known in the prior art. More specifically, vehicular water heater cores heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicular water heater cores include U.S. Pat. No. 5,012,070; U.S. Pat. No. 4,508,957; U.S. Pat. No. 4,713,522; U.S. Pat. No. 5,299,329; and U.S. Pat. Des. 339,434.

In these respects, the vehicular electric heater according to the present invention substantially departs from the conventional concepts and designs of the prior art, and in so doing provides an apparatus primarily developed for the purpose of quickly and efficiently heating a passenger compartment of a vehicle.

SUMMARY OF THE INVENTION

In view of the foregoing disadvantages inherent in the known types of vehicular water heater cores now present in the prior art, the present invention provides a new vehicular electric heater construction wherein the same can be utilized for quickly and efficiently heating a passenger compartment of a vehicle.

The general purpose of the present invention, which will be described subsequently in greater detail, is to provide a new vehicular electric heater apparatus and method which has many of the advantages of the vehicular water heater cores mentioned heretofore and many novel features that result in a new vehicular electric heater which is not anticipated, rendered obvious, suggested, or even implied by any of the prior art vehicular water heater cores, either alone or in any combination thereof.

To attain this, the present invention generally comprises a vehicle having an engine compartment and a ventilation system having a fan mounted therein. The fan is adapted to generate a flow of air through vents in a passenger compartment of the vehicle only during the receipt of a voltage. Further provided is a battery. Next provided is a heater coil assembly situated in the ventilation system downwind of the fan. As shown in FIG. 2, the heater coil has an insulative frame with a square configuration. A plurality of spaced parallel heating elements is connected between opposite sides of the frame. During use, the heater coil serves to generate heat only during the receipt of a voltage. Mounted on a control panel of the vehicle is a temperature control dial for selecting a temperature. Associated therewith is an activation switch mounted on the control panel for transmitting an activation signal upon the depression thereof. Finally, control means, in form of the control circuitry is connected between the fan, heater coil, temperature control dial, and activation switch. In use, the control means transmits a predetermined voltage amount to both the fan and the heater coil only during the receipt of the activation signal. It should be noted that the predetermined voltage is proportional to the temperature selected by way of the temperature control dial.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular electric heater apparatus and method which has many of the advantages of the vehicular water heater cores mentioned heretofore and many novel features that result in a new vehicular electric heater which is not anticipated, rendered obvious, suggested, or even implied by any of the prior art vehicular water heater cores, either alone or in any combination thereof.

It is another object of the present invention to provide a new vehicular electric heater which may be easily and efficiently manufactured and marketed.

It is a further object of the present invention to provide a new vehicular electric heater which is of a durable and reliable construction.

An even further object of the present invention is to provide a new vehicular electric heater which is susceptible of a low cost of manufacture with regard to both materials and labor, and which accordingly is then susceptible of low prices of sale to the consuming public, thereby making such vehicular electric heater economically available to the buying public.

Still yet another object of the present invention is to provide a new vehicular electric heater which provides in the apparatuses and methods of the prior art some of the advantages thereof, while simultaneously overcoming some of the disadvantages normally associated therewith.

Still another object of the present invention is to provide a new vehicular electric heater for quickly and efficiently heating a passenger compartment of a vehicle.

Even still another object of the present invention is to provide a new vehicular electric heater that includes a heater coil assembly situated in a ventilation system of a vehicle and adapted to generate heat only during the receipt of a voltage. A temperature control dial is mounted on a control panel of the vehicle for selecting a temperature. Finally, a control mechanism is adapted to transmit a predetermined voltage amount to the heater coil, wherein the predetermined voltage is proportional to the temperature selected by way of the temperature control dial.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
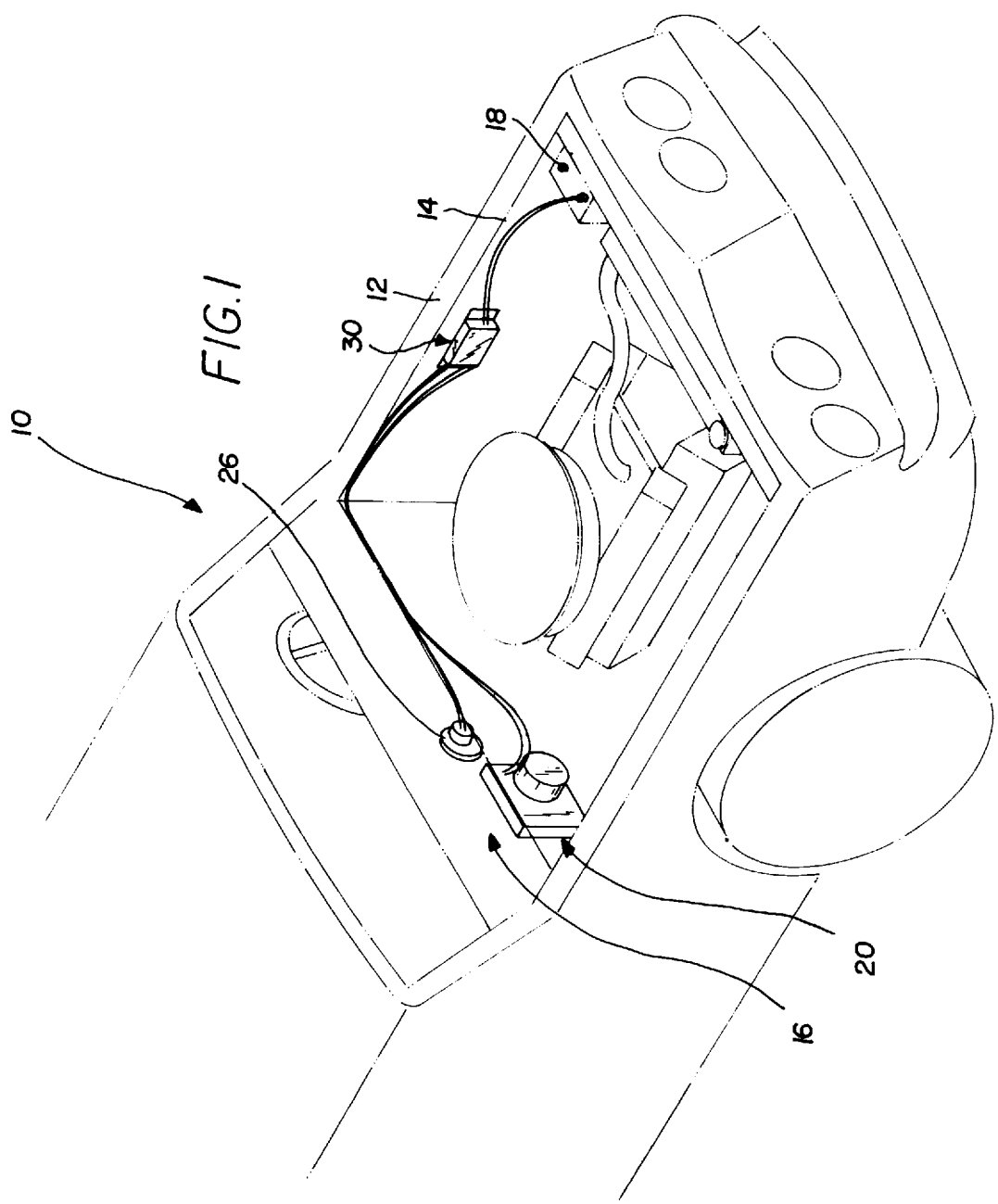
FIG. 1 is a perspective view of a new vehicular electric heater according to the present invention.
Figure 2:
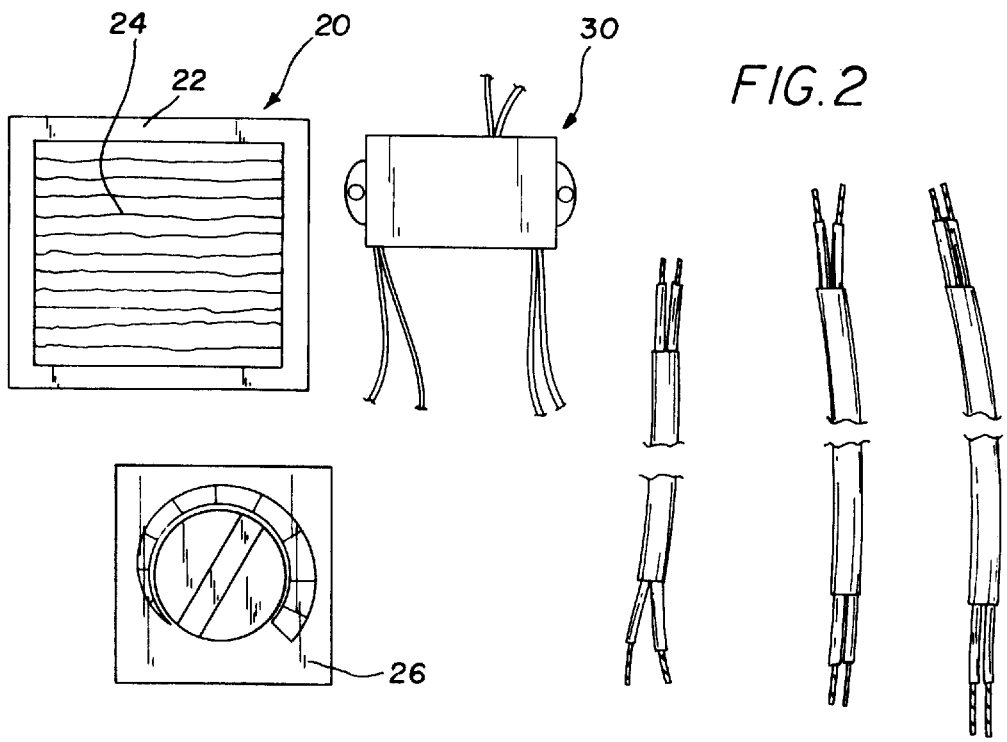
FIG. 2 is a perspective view of the various components of the present invention.
Figure 3:
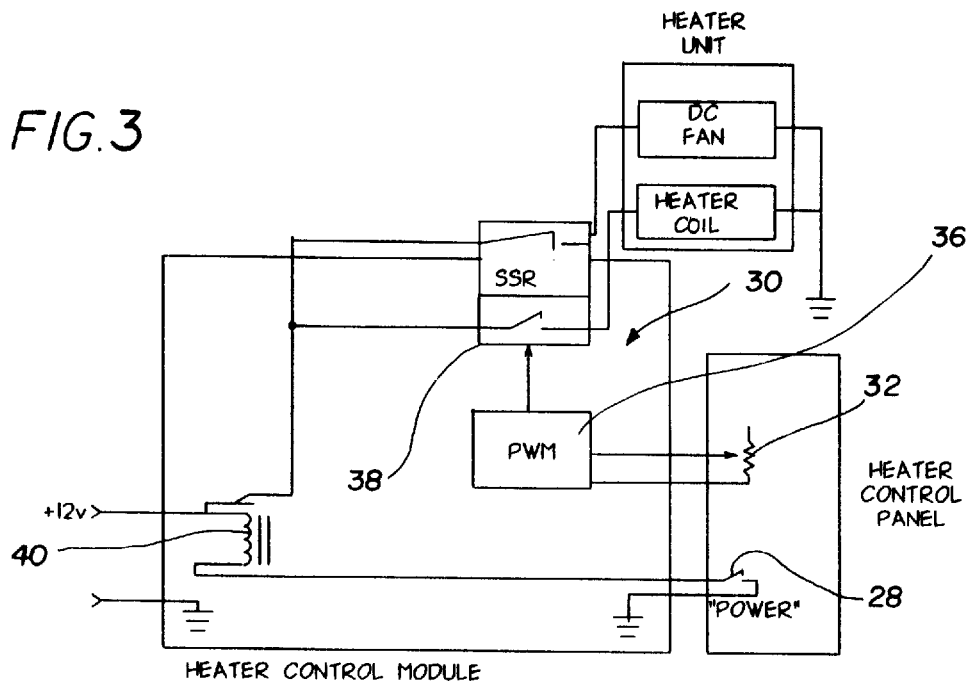
FIG. 3 is a schematic diagram of the present invention.

With reference now to the drawings, and in particular to FIGS. 1 through 3 thereof, a new vehicular electric heater embodying the principles and concepts of the present invention and generally designated by the reference numeral 10 will be described.

The present invention, as designated as numeral 10, is adapted for use with a vehicle 12 having an engine compartment 14 and a ventilation system 16 including a DC fan mounted therein. The fan is adapted to generate a flow of air through vents in a passenger compartment of the vehicle only during the receipt of a voltage. Further provided is a battery 18.

Next provided is a heater coil assembly 20 situated in the ventilation system downwind of the fan. It should be understood that the heater coil assembly replaces an existing metal water heater core. As shown in FIG. 2, the heater coil has an insulative frame 22 with a square configuration. A plurality of spaced parallel heating elements 24 is connected between opposite sides of the frame. During use, the heater coil serves to generate heat only during the receipt of a voltage. Upon the actuation of the both the fan and the heating coil assembly, the passenger compartment of the vehicle is heated by way of convection.

Mounted on a control panel of the vehicle is a temperature control dial 26 for selecting a temperature. As shown in FIG. 2, the temperature control dial has indicia imprinted thereon for indicating the temperature currently selected. Associated therewith is an activation switch 28 in the form of a toggle switch, push button switch, or the like. Such switch is mounted on the control panel for transmitting an activation signal upon the depression thereof.

Finally, control means 30, in form of control circuitry, is connected between the fan, heater coil, temperature control dial, and activation switch. The control means preferably resides in a housing, as shown in FIG. 2, which is mountable within the engine compartment of the vehicle. In use, the control means transmits a predetermined voltage amount to both the fan and the heater coil only during the receipt of the activation signal. It should be noted that the predetermined voltage is proportional to the temperature selected by way of the temperature control dial.

To accomplish the foregoing function, the control circuitry includes a potentiometer 32 connected to the temperature control dial for affording a discrete resistance unique to the temperature currently selected. Connected to the potentiometer is a pulse width modulator 36 for generating a series of positive pulses having a duty cycle which is a function of the resistance of the potentiometer. Such pulses are, in turn, transmitted to a solid state relay 38 which is connected between the battery and both the heater coil assembly and fan. Both the heater coil and the fan thus generate an amount of heat and air flow as a function of the duty cycle of the signal from the pulse width modulator. It should be understood that the fan generates a flow of air whenever the heating coil is actuated for preventing the same from burning.

As shown in FIG. 3, the activation switch is simply connected between ground and a relay 40 which, in turn, supplies the solid state relay with a voltage only when grounded, or in other words, when the activation switch is depressed. It is critical that the battery employed by the heater coil be first directed through an ignition circuit before connecting to the relay 40 to preclude the transfer of the power when the ignition is in a deactuated mode.

The present invention thus constitutes an after-market, easily retrofittable system which offers numerous advantages. For example, fuel would be saved and a passenger compartment would be heated instantly. Further, the potential for accidents would be reduced since the defroster vents of the ventilation system would immediately provide enough heat to clear a windshield.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle heater comprising, in combination:
   a vehicle having an engine compartment, a ventilation system having a fan mounted therein and adapted to generate a flow of air through vents in a passenger compartment of the vehicle only during the receipt of a voltage, and a battery, wherein at least one of the vents is a defroster vent;

a heater coil situated in the ventilation system downwind of the fan, the heater coil having an insulative frame with a square configuration and a plurality of spaced parallel heating elements connected between opposite sides of the frame, the heater coil adapted to generate heat only during the receipt of a voltage;

a temperature control dial mounted on a control panel of the vehicle for selecting a temperature, the temperature control dial has indicia imprinted thereon for indicating the temperature currently selected;

an activation switch mounted on the control panel adjacent the temperature control dial for transmitting an activation signal upon the depression thereof; and control means situated within a housing which is mountable within an engine compartment of the vehicle, the control means being connected between the fan, heater coil, temperature control dial, and activation switch, the control means adapted to transmit a predetermined voltage amount to both the fan and the heater coil only during the receipt of the activation signal, wherein the predetermined voltage is proportional to the temperature selected by way of the temperature control dial;

wherein the control means includes a potentiometer connected to the temperature control dial for affording a resistance unique to the temperature currently selected, a pulse width modulator connected to the potentiometer for generating a series of positive pulses having a duty cycle which is a function of the resistance of the potentiometer, wherein the pulses are transmitted to a solid state relay which is connected between the battery and both the heater coil and fan such that the heater coil and the fan generate an amount of heat and air flow that are a function of the duty cycle of the pulses from the pulse width modulator.

* * * * *